(12) United States Patent  
Katayama et al.

(10) Patent No.: US 6,733,101 B2
(45) Date of Patent: May 11, 2004

(54) PRINTING APPARATUS AND CONTROL METHOD THEREFOR

(75) Inventors: Akira Katayama, Yokohama (JP); Seiji Niida, Fussa (JP)

(73) Assignee: Canon Aptex Kabushiki Kaisha, Ibaraki (JP)

( * ) Notice: Subject to any disclaimer, the term of this patent is extended or adjusted under 35 U.S.C. 154(b) by 0 days.

(21) Appl. No.: 09/218,418

(22) Filed: Dec. 22, 1998

(65) Prior Publication Data

US 2002/0089560 A1 Jul. 11, 2002

(30) Foreign Application Priority Data

Dec. 24, 1997 (JP) .............................. 9-355801

(51) Int. Cl.[7] .......................................... B41J 29/398
(52) U.S. Cl. ...................................................... 347/14
(58) Field of Search ........................ 347/16, 12, 9, 347/104, 14, 37, 39; 346/136; 400/71, 279

(56) References Cited

U.S. PATENT DOCUMENTS

| | | | | |
|---|---|---|---|---|
| 4,686,540 A | * | 8/1987 | Leslie et al. | 346/136 |
| 4,734,868 A | * | 3/1988 | DeLacy | 358/1.12 |
| 4,839,674 A | * | 6/1989 | Hanagata et al. | 346/136 |
| 5,061,947 A | * | 10/1991 | Morrison et al. | 346/136 |
| 5,309,524 A | | 5/1994 | Hirabayashi et al. | 382/47 |
| 5,483,275 A | * | 1/1996 | Higashi et al. | 346/136 |
| 5,614,928 A | * | 3/1997 | Matsuda | 347/2 |
| 5,736,996 A | * | 4/1998 | Takada et al. | 347/16 |
| 5,854,964 A | * | 12/1998 | Atsumi | 399/371 |
| 5,940,106 A | * | 8/1999 | Walker | 347/104 |
| 5,963,224 A | * | 10/1999 | Shimoda | 347/9 |
| 5,964,540 A | * | 10/1999 | Shiina et al. | 400/149 |

FOREIGN PATENT DOCUMENTS

| | | | |
|---|---|---|---|
| EP | 62-216777 | 9/1987 | |
| EP | 0488406 A1 | * 3/1992 | ............ 347/16 |
| EP | 0488406 | 6/1992 | |
| EP | 0710567 | 5/1996 | |
| EP | 0729846 | 6/1996 | |

* cited by examiner

Primary Examiner—Thinh Nguyen
Assistant Examiner—Julian D. Huffman
(74) Attorney, Agent, or Firm—Fitzpatrick, Cella, Harper & Scinto

(57) ABSTRACT

The main controller of an ink-jet printer sets a read address in a driver controller to read out image data from an image memory which stores image data to be printed, in units of print lines. The driver controller reads out image data of one line from the image memory in accordance with the set address to print the image of one line, and conveys printing paper in synchronism with this printing. The main controller controls setting of the read address in the driver controller to execute magnification processing in the direction of conveyance on the basis of a set correction amount. When appropriate magnification processing is performed for print image data, any mechanical error of the conveyor mechanism is absorbed.

31 Claims, 18 Drawing Sheets

FIG. 14A

| | CORRECTION DEGREE | -8 | -7 | -6 | -5 | -4 | -3 | -2 | -1 | 0 |
|---|---|---|---|---|---|---|---|---|---|---|
| 1 | MEASURED VALUE OF TOF INTERVAL | 2218 | 2222 | 2226 | 2230 | 2234 | 2238 | 2242 | 2246 | 2250 |
| 2 | FEED AMOUNT PER LINE | 0.0716 | 0.0714 | 0.0713 | 0.0712 | 0.0711 | 0.0709 | 0.0708 | 0.0707 | 0.0706 |
| 3 | IMAGE SIZE FOR 2,250 LINES | 161.04 | 160.75 | 160.46 | 160.17 | 159.89 | 159.6 | 159.32 | 159.03 | 158.75 |
| 4 | IMAGE SIZE ERROR | 2.2904 | 2.0005 | 1.7116 | 1.4238 | 1.137 | 0.8512 | 0.5665 | 0.2827 | 0 |
| 5 | NECESSARY NUMBER OF CORRECTED LINES | -32 | -28 | -24 | -20 | -16 | -12 | -8 | -4 | 0 |
| 6 | | | | | ←---- SKIP LINE ----→ | | | | | |
| 7 | CORRECTION LINE PERIOD | 69 | 79 | 93 | 112 | 140 | 186 | 280 | 562 | |
| 8 | SIZE AFTER CORRECTION   mm | 158.75 | 158.75 | 158.75 | 158.75 | 158.75 | 158.75 | 158.75 | 158.75 | 158.75 |
| 9 | ERROR AFTER CORRECTION   mm | 0 | 0 | 0 | 0 | 0 | 0 | -3E-14 | 0 | |

FIG. 14B

| | | CORRECTION DEGREE | 0 | 1 | 2 | 3 | 4 | 5 | 6 | 7 | 8 |
|---|---|---|---|---|---|---|---|---|---|---|---|
| 1 | | MEASURED VALUE OF TOF INTERVAL | 2250 | 2254 | 2258 | 2262 | 2266 | 2270 | 2274 | 2278 | 2282 |
| 2 | | FEED AMOUNT PER LINE | 0.0706 | 0.0704 | 0.0703 | 0.0702 | 0.0701 | 0.0699 | 0.0698 | 0.0697 | 0.0696 |
| 3 | | IMAGE SIZE FOR 2,250 LINES | 158.75 | 158.47 | 158.19 | 157.91 | 157.63 | 157.35 | 157.07 | 156.8 | 156.52 |
| 4 | | IMAGE SIZE ERROR | 0 | -0.282 | -0.562 | -0.842 | -1.121 | -1.399 | -1.675 | -1.951 | -2.226 |
| 5 | | NECESSARY NUMBER OF CORRECTED LINES | 0 | 4 | 8 | 12 | 16 | 20 | 24 | 28 | 32 |
| 6 | | | | | | ← - - - - PILE LINE - - - - → | | | | | |
| 7 | | CORRECTION LINE PERIOD | | 563 | 282 | 188 | 142 | 114 | 95 | 81 | 71 |
| 8 | | SIZE AFTER CORRECTION mm | 158.75 | 158.75 | 158.75 | 158.75 | 158.75 | 158.75 | 158.75 | 158.75 | 158.75 |
| 9 | | ERROR AFTER CORRECTION mm | | 0 | 0 | -3E-14 | 0 | 0 | 0 | 0 | 0 |

PRINTING APPARATUS AND CONTROL METHOD THEREFOR

BACKGROUND OF THE INVENTION

The present invention relates to a printing apparatus and, more particularly, to a printing apparatus which uses a printing medium such as paper having a continuous shape and is suitable to print a continuous print image, and a control method therefor.

Conventional printing apparatuses for printing an image on a printing medium (to also be simply referred to as printing paper hereinafter) such as a paper sheet, textile, plastic sheet, or OHP sheet use various print schemes, and printing apparatuses having printheads using the wire dot, thermal printing, heat transfer printing, or ink-jet methods have been proposed.

Of these schemes, the ink-jet method is one of noise-free non-impact methods of directly discharging ink to printing paper. The ink-jet methods are roughly classified into continuous types (including charged particle control and spray methods) and on-demand types (including piezo, spark, and bubble-jet types) depending on the ink droplet formation method and discharge energy generation method.

In the continuous types, ink is continuously discharged, and charges are applied to only necessary droplets. The charged droplets stick to printing paper, and the remaining droplets are wasted. To the contrary, in the on-demand type, ink is discharged only when it is necessary to print. For this reason, the ink is not wasted, and no contamination occurs in the apparatus. In addition, the response frequency for the on-demand type is lower than that for the continuous type because ink discharge is started or stopped. The number of nozzles is increased to realize high-speed printing. Most of currently commercially available printing apparatuses use the on-demand type. Printing apparatuses having an ink-jet printhead can print at high density and high speed and therefore are commercially available as output terminals for copying machines, facsimile apparatuses, word processors, or personal computers.

Generally, an ink-jet printing apparatus has a printhead, an ink tank for supplying ink to the printhead, a conveyor means for conveying printing paper, and a control means for controlling these elements. The ink-jet printhead which discharges ink droplets from a plurality of discharge ports is serially scanned in a direction perpendicular to the printing paper conveyance direction. While the head is not printing, the printing paper is intermittently conveyed by an amount equal to the print width. Since the ink is discharged onto the printing paper in accordance with a print signal, this printing method is popularly used as a noise-free print method at low running cost.

When a full-line type ink-jet printhead having nozzles aligned on an array corresponding to the width of printing paper is used, and the printing paper is continuously conveyed in a direction perpendicular to the nozzle array of the ink-jet printhead, printing in the paper width is performed. With this arrangement, the speed of printing can be further increased.

In a color ink-jet printing apparatus, a color image is formed by superposing ink droplets dischargeed from a plurality of color printheads. Generally, for color printing, four ink-jet printheads and ink tanks corresponding to three colors of yellow (Y), magenta (M), and cyan (C) or four colors additionally including black (Bk) are required. Currently, color printing apparatuses having such a plurality of color ink-jet printheads and capable of forming a full-color image have been put into practical use.

The energy generation means for generating an energy for causing the ink-jet printhead to discharge ink uses an electromechanical converter such as a piezo element or an electrothermal transducer having a heating resistor to heat the liquid.

Especially, an ink-jet printhead using a method (so-called bubble-jet) if discharging ink using a thermal energy (using a film boiling phenomenon) can have liquid discharge ports at high density, and can print a high-resolution image.

Demands for such ink-jet printing apparatuses have arisen in various fields. In the field of, e.g., geologic formation probing, an ink-jet printing apparatus is used to continuously print several meters or more of geologic formation data using a plurality of colors. In the apparel industry as well, an ink-jet printing apparatus is used to print on clothing materials. As described above, demands for ink-jet printing apparatuses have arisen in various industrial fields as an excellent printing means. It is also required to obtain a higher-quality image.

As described above, an ink-jet printing apparatus can also be applied to print a continuous print image having a length of several meters or more. In this case as well, a print image must always be stably printed at a predetermined print length, i.e., at the same print length as the precedingly output print image. For this purpose, the mechanical printing medium conveyance accuracy is conventionally improved.

In recent years, the resolution of an ink-jet printhead is largely increasing from 360 dpi to 600 or 720 dpi. However, the mechanical accuracy of the conveyor mechanism for conveying a printing medium has improved little, so the ratio of mechanical conveyance errors to the pixel pitch of the printhead is increasing. In printing an image of A4 size, the error in length of a print image is small. However, when one print image continues for several meters or more, mechanical conveyance errors accumulate, resulting in a large error in length of the print image.

SUMMARY OF THE INVENTION

The present invention has been made in consideration of the above problem, and has as its object to provide a printing apparatus which performs appropriate magnification processing for print image data to absorb any mechanical error of a conveyor mechanism, and a control method therefor.

It is another object of the present invention to detect any conveyance errors of the conveyor mechanism before print processing, thereby allowing setting of the correction amount by the above magnification processing.

It is still another object of the present invention to achieve the above magnification processing by increasing/decreasing the number of print lines, thereby further simplifying the arrangement.

It is still another object of the present invention to superpose data of a print line to be deleted on data of the next print line when reduction is performed as magnification processing, thereby reducing the loss of print information.

It is still another object of the present invention to detect any feed amount error of the conveyor mechanism during printing and to set the magnification amount of the print data on the basis of the feed amount error.

It is still another object of the present invention to obtain the magnification amount set on the basis of the feed amount error detected during printing with reference to a table in which the feed amount error and magnification amount are paired and registered, thereby allowing high-speed setting of magnification processing.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 14A and 14B are views showing correction line periods corresponding to the average values of measured TOF mark intervals;

DETAILED DESCRIPTION OF THE PREFERRED EMBODIMENTS

Preferred embodiments of the present invention will now be described in detail in accordance with the accompanying drawings.

The embodiments of an ink-jet printing apparatus to which the present invention is applied will be described below in detail with reference to the accompanying drawings.

(First Embodiment)

Figure 1:
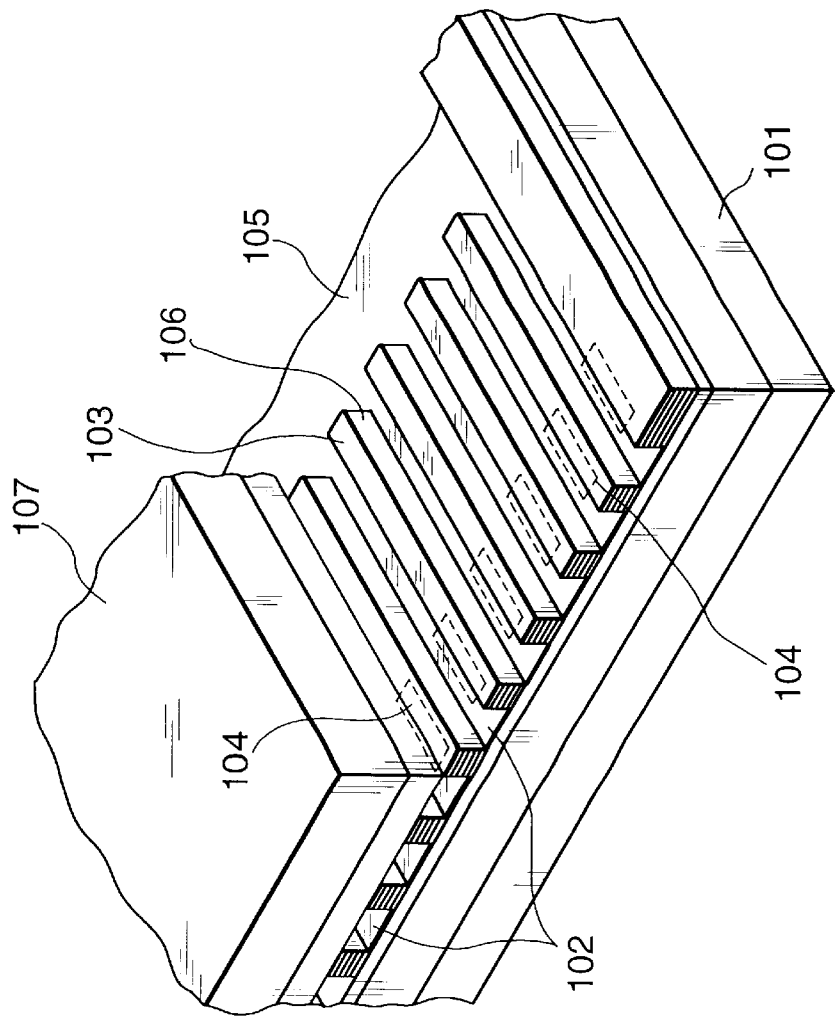
FIG. 1 is a schematic view for explaining the structure of a bubble-jet printhead used in the first embodiment.

FIG. 1 is a schematic view for explaining the structure of an ink-jet printhead used in this embodiment.

Each nozzle 106 has a heating element (heater) 104. When a predetermined energy is applied to the heater 104 by a head driving circuit, an ink droplet is discharged from an discharge port 102.

The heaters 104 are formed on a silicon substrate 101 by the same method as a semiconductor manufacturing process. A nozzle partition 103 forms each nozzle 106. Reference numeral 105 denotes a common liquid chamber for supplying ink to the nozzles 106; and 107, a top plate 107.

Figure 2:
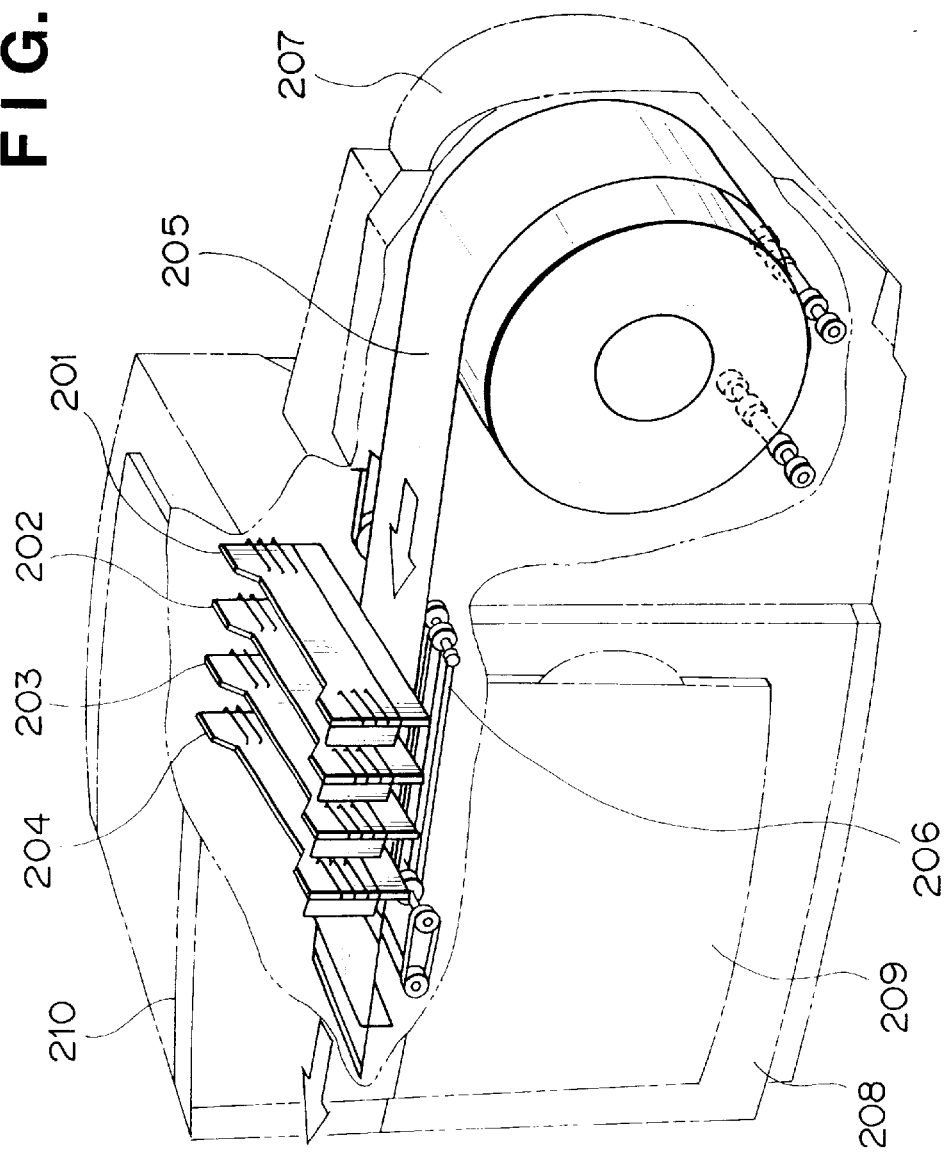
FIG. 2 is a perspective view for explaining the arrangement of an ink-jet printing apparatus according to the first embodiment.

FIG. 2 is a perspective view for explaining the structure of the ink-jet printing apparatus of this embodiment.

A PHS unit 210 has ink-jet heads 201 to 204 and a recovery system unit (not shown) for always guaranteeing stable discharge. Printing paper 205 is supplied from a roll supply unit 207 and continuously conveyed by a conveyor unit 206 arranged in a printing apparatus main body 208.

In printing an image, the paper is conveyed by the conveyor unit 206. When the reference position of the paper comes under the black ink-jet printhead 201, black ink is discharged from the ink-jet printhead. Similarly, color inks are sequentially discharged from the cyan ink-jet printhead 202, magenta ink-jet printhead 203, and yellow ink-jet printhead 204 in the order named, thereby forming a color image.

The printing apparatus main body 208 is constituted by the conveyor unit 206, ink cartridges (not shown) for storing inks to be supplied to the ink-jet printheads, a pump unit (not shown) for performing ink supply to the printheads or recovery operation, and a control board (not shown) for controlling the entire printing apparatus. A front door 209 is opened to exchange the ink cartridges.

Figure 3:
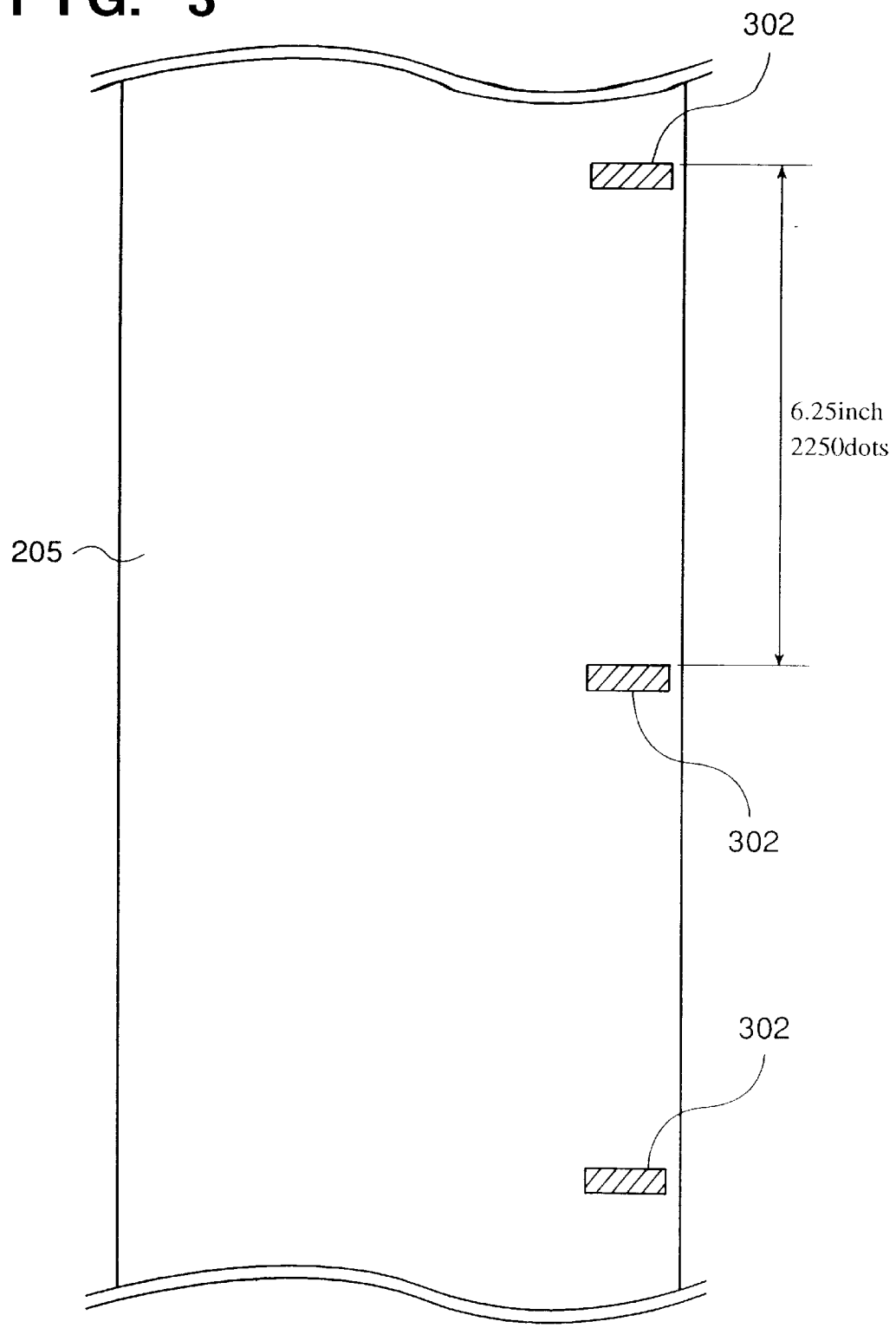
FIG. 3 is a view showing a printing medium (printing paper) used in the ink-jet printing apparatus of the first embodiment.

FIG. 3 is a view showing a printing medium (printing paper) used in the ink-jet printing apparatus of this embodiment. The printing paper used in this printing apparatus has, on its lower surface, TOF marks 302 each indicating the top of form. The ink-jet printing apparatus of this embodiment counts the intervals of the TOF marks 302 on the basis of the conveyor motor driving pulses, thereby measuring the paper conveyance accuracy. The printing paper shown in FIG. 3 has a length of 6.25 inches per page, which corresponds to 2,250 dots (lines) when the printing density is 360 dpi.

Figure 4:
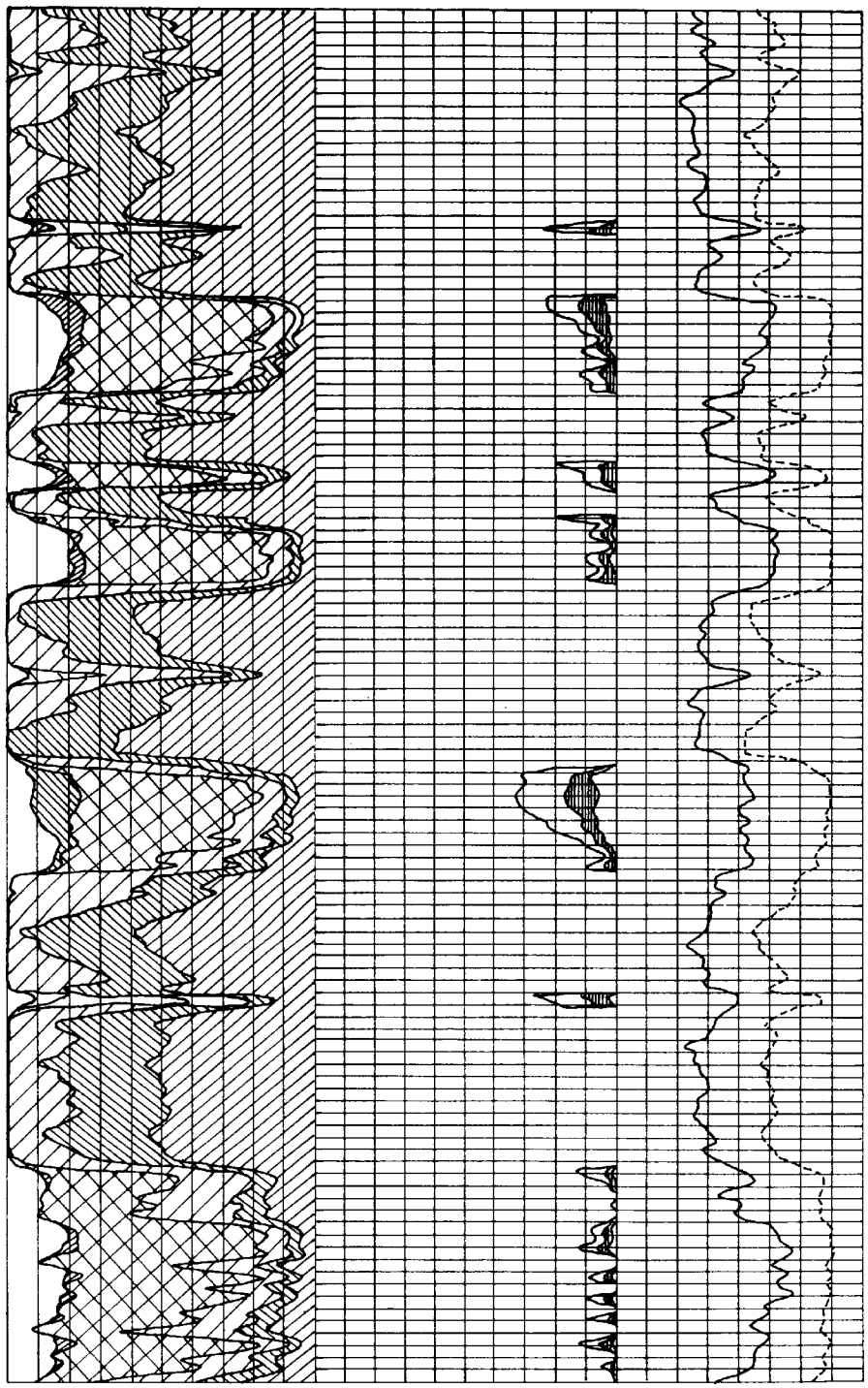
FIG. 4 is a view showing a sample of an image printed by the ink-jet printing apparatus of the first embodiment.

FIG. 4 is a view showing a sample of an image printed by the ink-jet printing apparatus of this embodiment. Image data obtained by synthesizing measured data is transferred from the host computer while printing vertical and horizontal black ruled lines of a graph.

Figure 5:
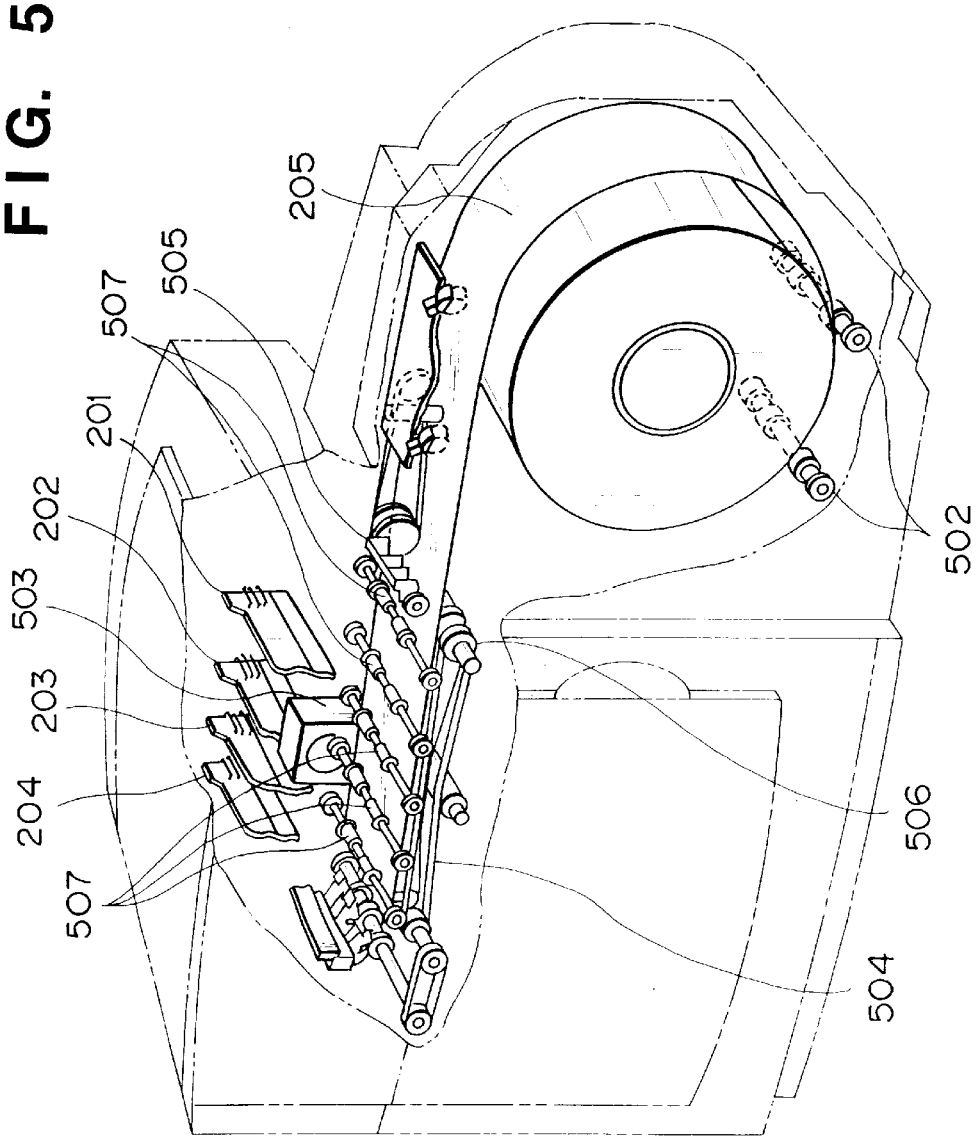
FIG. 5 is a perspective view showing the paper conveyor system of the ink-jet printing apparatus of the first embodiment.

FIG. 5 is a perspective view showing the paper conveyor system of the ink-jet printing apparatus of this embodiment. The printing paper 205 as a printing medium is driven by a supply roller 502 and guided to the main body conveyor unit. Driving of a conveyor motor 503 is transmitted to the pair of a pinch roller 505 and driving roller 506 through a conveyor belt 504 to convey the printing paper 205. Spurs 507 prevent any floating of the printing paper 205. Each of the ink-jet printheads 201 to 204 has ink discharge nozzles aligned in correspondence with the print width of the printing paper 205, as described with reference to FIG. 2, and this apparatus has heads for four colors: black, yellow, magenta, and cyan.

Figure 6:
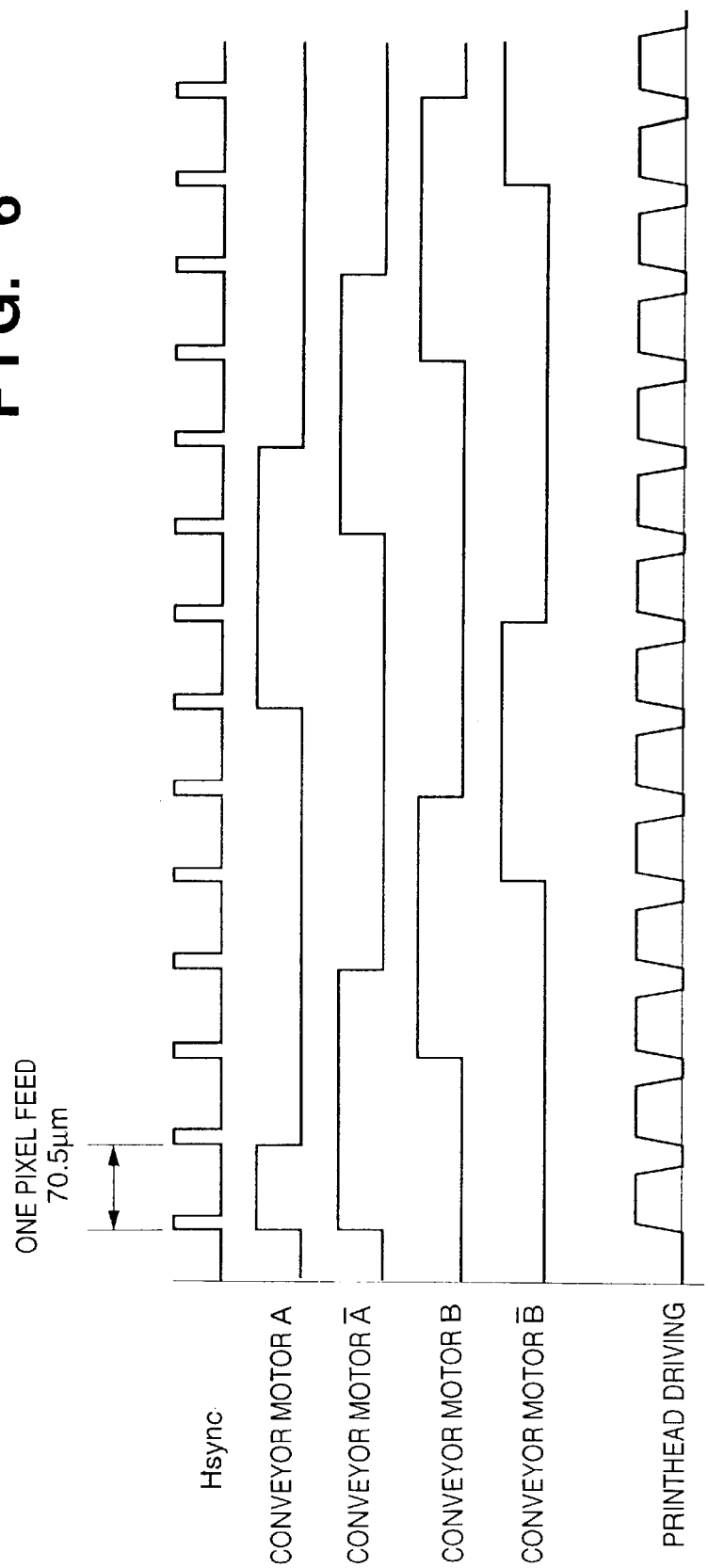
FIG. 6 is a timing chart showing driving signals for pulse motors for paper conveyance in the ink-jet printing apparatus of the first embodiment.

FIG. 6 is a timing chart showing driving signals for pulse motors for paper conveyance in the ink-jet printing apparatus of this embodiment. The phase excitation signal of the conveyor motor 503 is switched in synchronism with an excitation switching timing signal (Hsync) for the paper conveyor stepping motor (conveyor motor 503), as shown in FIG. 6. The paper conveyance amount per step of the conveyor motor 503 is mechanically designed to be a moving amount corresponding to one pixel pitch. If the print image resolution is 360 dpi, the moving amount is about 70.5 μm. Each printhead is driven in synchronism with the excitation switching timing signal (to be referred to as the paper conveyor motor phase excitation switching signal Hsync hereinafter) for the paper conveyor pulse motor to print an image at a desired position. However, a feed amount error of about 0.5% is generated due to, e.g., mechanical fabrication errors of the mechanical components. For the general A4 size, an error of about 1.5 mm is generated during printing of an about 300-mm long image. However, in continuous printing of an image having a length of about 5,000 mm, the error is about 25 mm. This poses a serious problem if the printed image contains dimensional elements.

Figure 7:
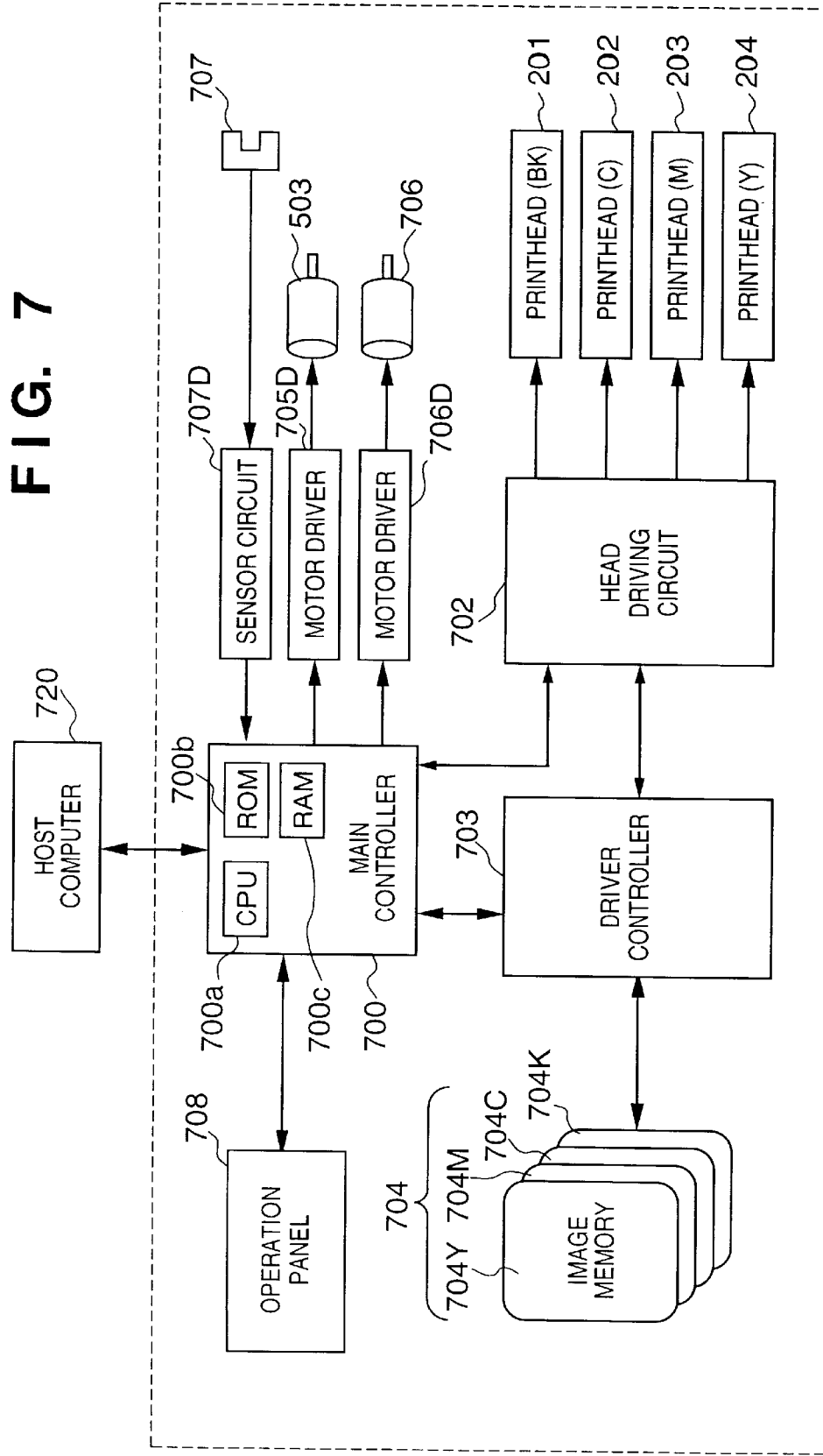
FIG. 7 is a block diagram showing the electrical arrangement of the ink-jet printing apparatus according to the first embodiment.

FIG. 7 is a block diagram showing the electrical arrangement of the ink-jet printing apparatus of the first embodiment.

A main controller 700 has a CPU 700a, ROM 700b, and RAM 700c and performs various control operations for the printing apparatus. The CPU 700a realizes various control operations in accordance with a control program stored in the ROM 700b. The RAM 700c provides a work area for the CPU 700a to execute various control operations.

Figure 16:
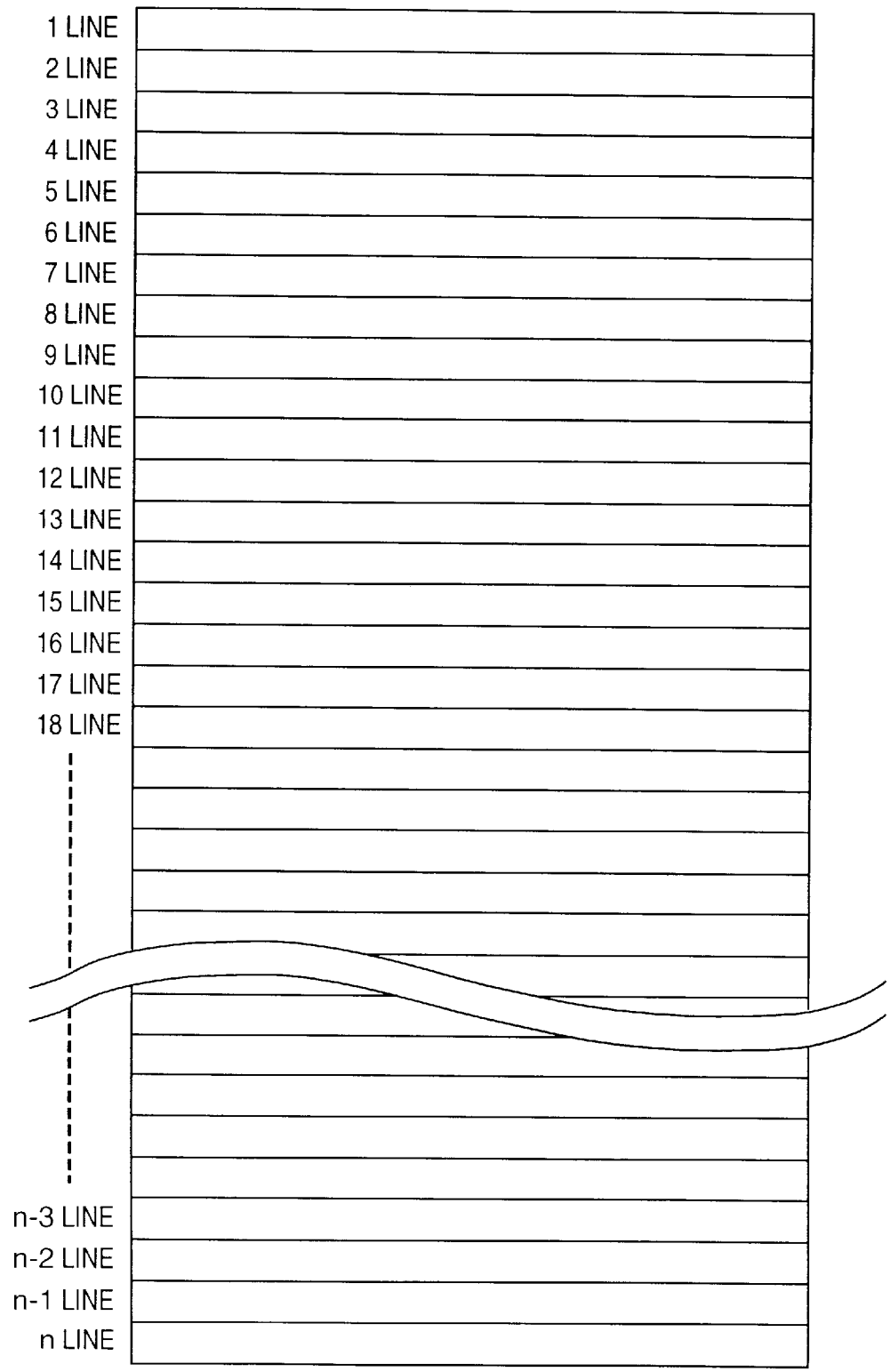
FIG. 16 is a view showing the data structure of the image memory of the ink-jet printing apparatus of the first embodiment.

As a normal printing procedure, a print image is continuously transferred from a host computer 720, received by the main controller 700, and stored in image memories 704C, 704M, 704Y, and 704K (these image memories will be referred to as an image memory 704 hereinafter) in units of color components (CMYK). The print data is written in the image memory 704 in units of lines transferred from the host computer 720 and stored in units of colors, as shown in FIG. 16. The print data is sequentially read out from the memories in units of colors at the respective timings in synchronism with the phase excitation switching signal (Hsync) for the paper conveyor motor, and transferred to the printheads 201 to 204 through the head driving circuit 702 in units of colors.

A motor driver 705D switches phase excitation of the paper conveyor motor 503 in synchronism with the paper conveyor motor phase excitation switching signal Hsync. In interrupt processing for an interrupt signal generated in synchronism with the paper conveyor motor phase excitation switching signal Hsync, the main controller 700 sets, in a driver controller 703, the start address of print image data of each line stored in the image memory 704. The driver controller 703 reads out the print image data from the image memory 704 in synchronism with the paper conveyor motor phase excitation switching signal Hsync and transfers the data to a head driving circuit 702. By repeating the above processing, the continuous image is printed. A motor 706 drives an ink pump motor or the recovery mechanism, and a motor driver 706D drives the motor 706.

In this embodiment, since paper is conveyed in synchronism with the phase excitation switching signal (Hsync) for the conveyor motor 503, the intervals of the TOF marks 302 each indicating the top of one page of the printing paper 205 shown in FIG. 3 can be measured on the basis of the number of pulses of the phase excitation switching signal (Hsync) for the conveyor motor 503, so the mechanical feed amount error of paper conveyance can be measured. When a TOF sensor 707 in FIG. 7 detects the TOF mark 302, counting of the pulse Hsync is started. When the next TOF mark 302 is detected, whether the counted number of pulses Hsync is larger or smaller than the logic value 2,250 can be determined (when the TOF mark interval is 6.25 inches, and the printing density is 360 dpi). A sensor circuit 707D amplifies the TOF mark detection signal from the TOF sensor 707 and transmits it to the main controller 700.

Reference numeral 708 denotes an operation panel through which the user can perform various setting operations for the ink-jet printer. The operation panel 708 has a display device (not shown) so that the state of the printer can be presented to the user.

By the above method, whether enlargement or reduction has occurred due to the mechanical error amount and conveyance error of the conveyor mechanism can be determined. In this embodiment, the read line start address of the image memory 704 is controlled on the basis of this information to reduce the image when it has been enlarged or enlarge the image when it has been reduced.

More specifically, if the paper feed amount is small, the image has been reduced due to the conveyance error In this case, updating the read line start address is skipped every predetermined number of lines of the printed image data from the image memory 704. That is, data of one line is printed twice. By continuously repeating this processing, the length of the printed image can be corrected. For example, when the paper feed error amount is about −0.1%, duplicate printing is performed every 1,000 lines, and when the paper feed error amount is about −0.5%, duplicate printing is performed every 200 lines, thereby correcting the length of the printed image.

Conversely, when the paper feed amount is large, the image has been enlarged due to the conveyance error. In this case, the read line start address is updated to one more line ahead every predetermined number of lines of the printed image data from the image memory 704. That is, data of a certain line is canceled. By continuously repeating this processing, the length of the printed image can be corrected. For example, when the paper feed amount is about +0.1%, data of one line is canceled every 1,000 lines, and when the paper feed amount is about +0.5%, data of one line is canceled every 200 lines, thereby correcting the length of the printed image.

Figure 8:
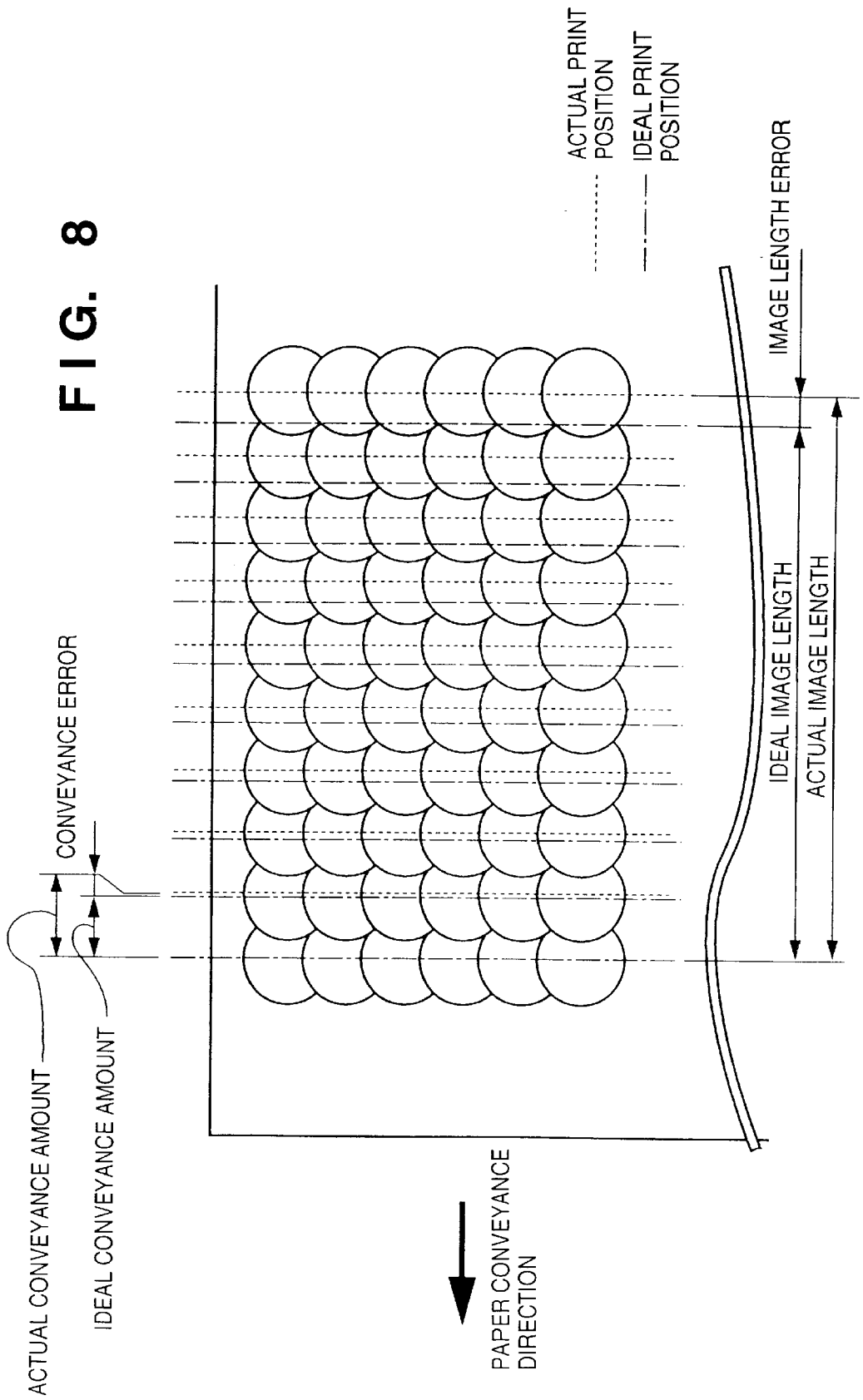
FIG. 8 is a view showing an image size when a mechanical error is present between the ideal print position and the paper conveyance amount in image printing.

FIG. 8 is a view showing an image size when a mechanical error is present between the ideal print position and the paper conveyance amount in image printing. As shown in FIG. 8, as the number of printed lines increases, the conveyance errors accumulate, so the error between the ideal image length and the actually obtained image length increases.

Figure 9:
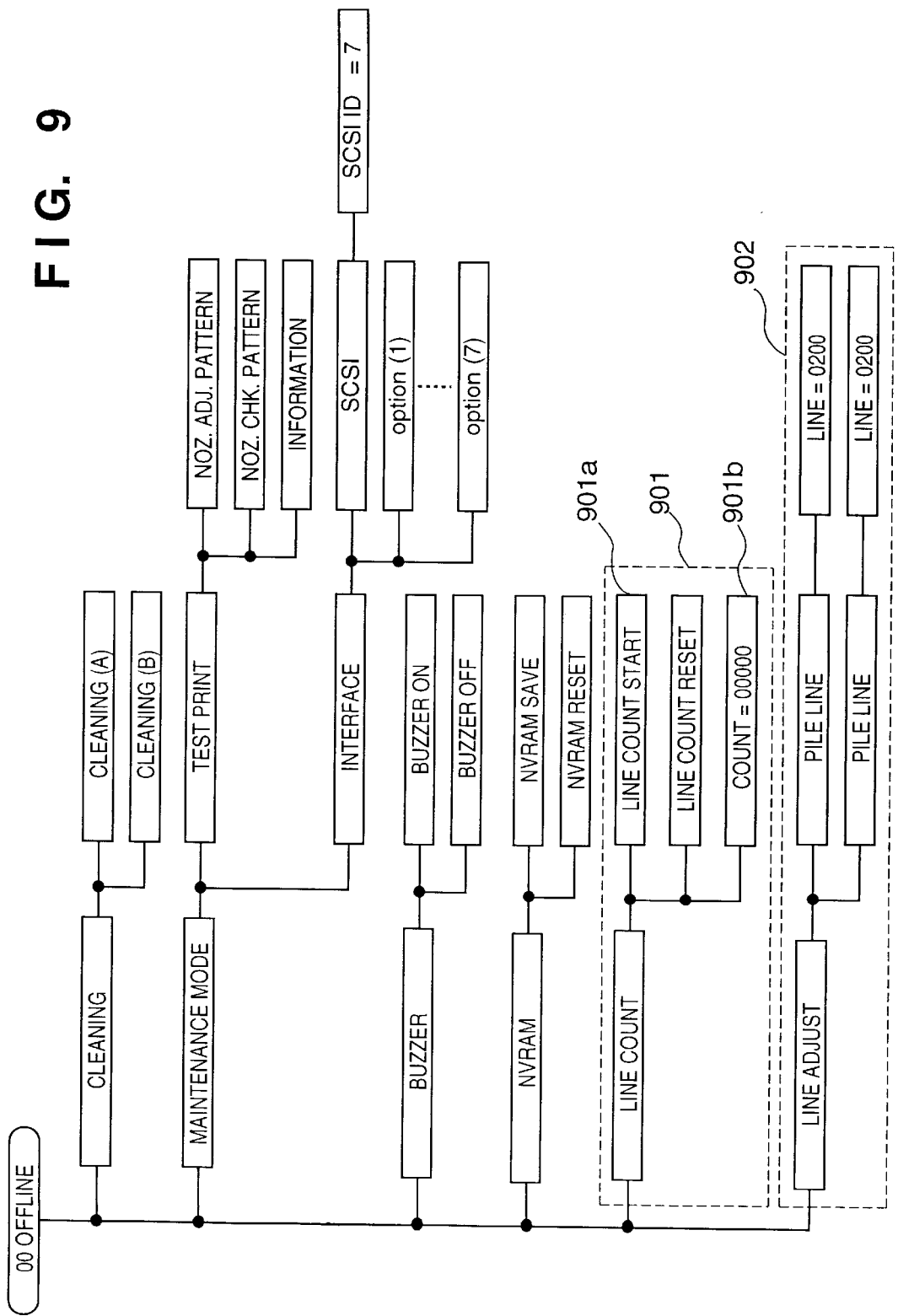
FIG. 9 is a view showing the menu hierarchy of the operation panel of the ink-jet printing apparatus of the first embodiment.

FIG. 9 is a view showing the menu hierarchy of operations which can be performed through the operation panel 708 of the ink-jet printing apparatus of this embodiment. The printing apparatus of this embodiment incorporates a function 901 of measuring the TOF mark interval of the printing paper and a function 902 of setting the correction amount. The operator uses the former function to set the conveyance amount and the correction setting function to set the correction amount.

Each function shown in FIG. 9 is selected off-line. For example, when "LINE COUNT START" is selected, only conveyance of the printing paper is executed, and the number of pulses Hsync between the TOF marks 302 is counted. As described above, the TOF marks 302 are detected by the TOF sensor 707. After this, by selecting "COUNT", the count can be confirmed through the display device of the operation panel 708. The correction amount can be set on the basis of the difference from the ideal count.

For example, as shown in FIG. 3, when the ideal count is 2,250, and the actual count is 2,275 (this means that the paper feed amount is small), the correction amount is,

[theoretical number]÷([actual count]−[theoretical number])= 2250÷(2275−2250)=90

Therefore, the same line data is duplicated every 90 lines. The user selects "PILE LINE" of the function 902 and sets 0090 as "LINE" through the operation panel 708.

The printing apparatus may automatically calculate and set the correction amount (90 in the above example). Alternatively, the automatically calculated correction amount may be presented to the user through the display device of the operation panel 708. In addition, the above-described correction amount setting operation and various related display operations through the operation panel may be performed from the host computer 720 connected to the ink-jet printer.

Figure 17:
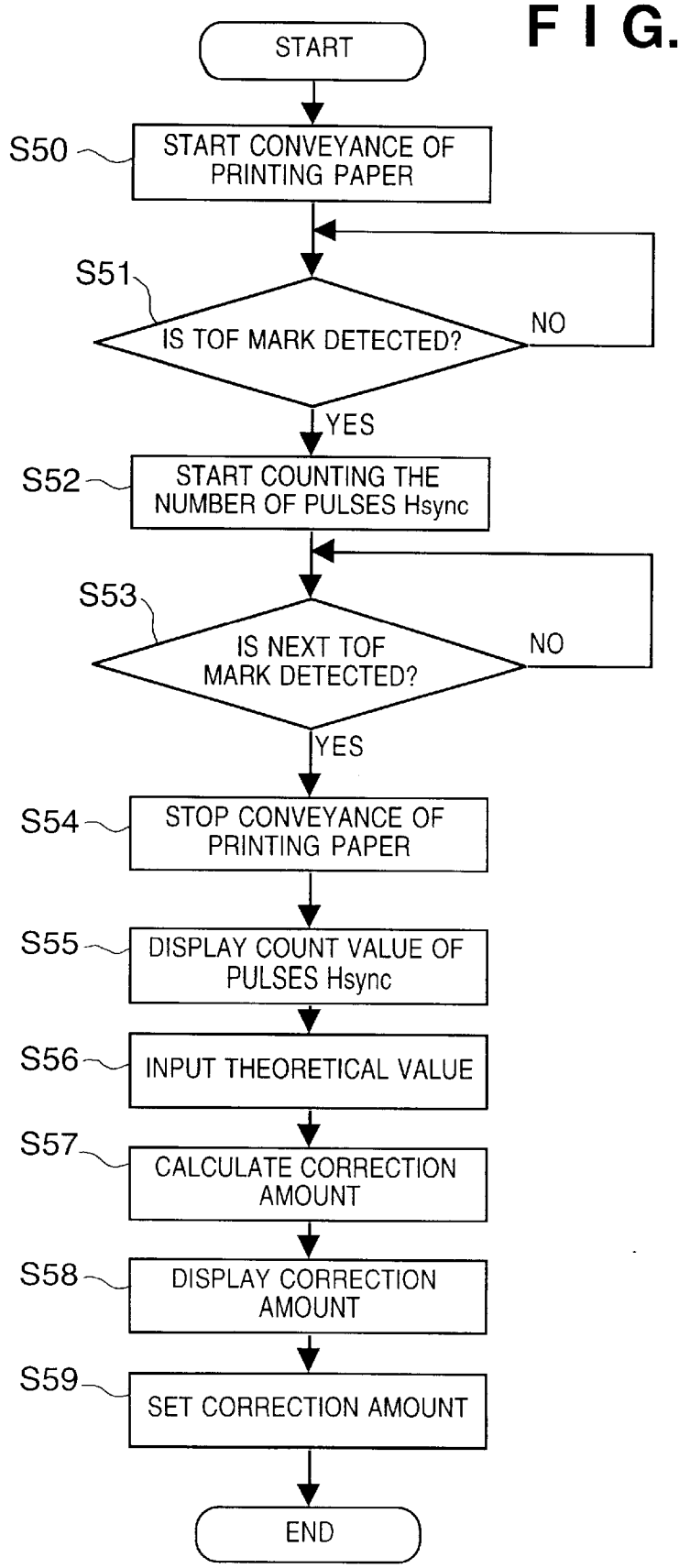
FIG. 17 is a flow chart for explaining off-line correction amount setting processing.

An example of processing by the main controller 700 associated with the above-described correction amount setting operation will be described below with reference to the flow chart shown in FIG. 17. In step S50, conveyance of printing paper is started by controlling the motor driver 705D. When the TOF sensor 707 detects a TOF mark on the printing paper, count of the number of pulses Hsync to the conveyor motor 505 is started (steps S51 and S52). When the next TOF mark is detected by the TOF sensor 707, conveyance of the printing paper is stopped. The count value of the number of pulses Hsync to the conveyor motor 505 at the time of detection of the TOF mark is obtained and displayed on the display device of the operation panel 708 (steps S53, S54, and S55).

The actual interval between the TOF marks on the printing paper is input from the operation panel 708. In this example, the theoretical count of pulses Hsync, 2,250, is input. However, another numerical value, e.g., a value representing the TOF mark interval in centimeters or inches may be input.

In step S57, the correction value is calculated by the above-described method on the basis of the count value obtained by processing to step S55 and the theoretical value input in step S56. The obtained correction value is set as a correction value to be used for the subsequent correction processing (step S59).

Figure 10:
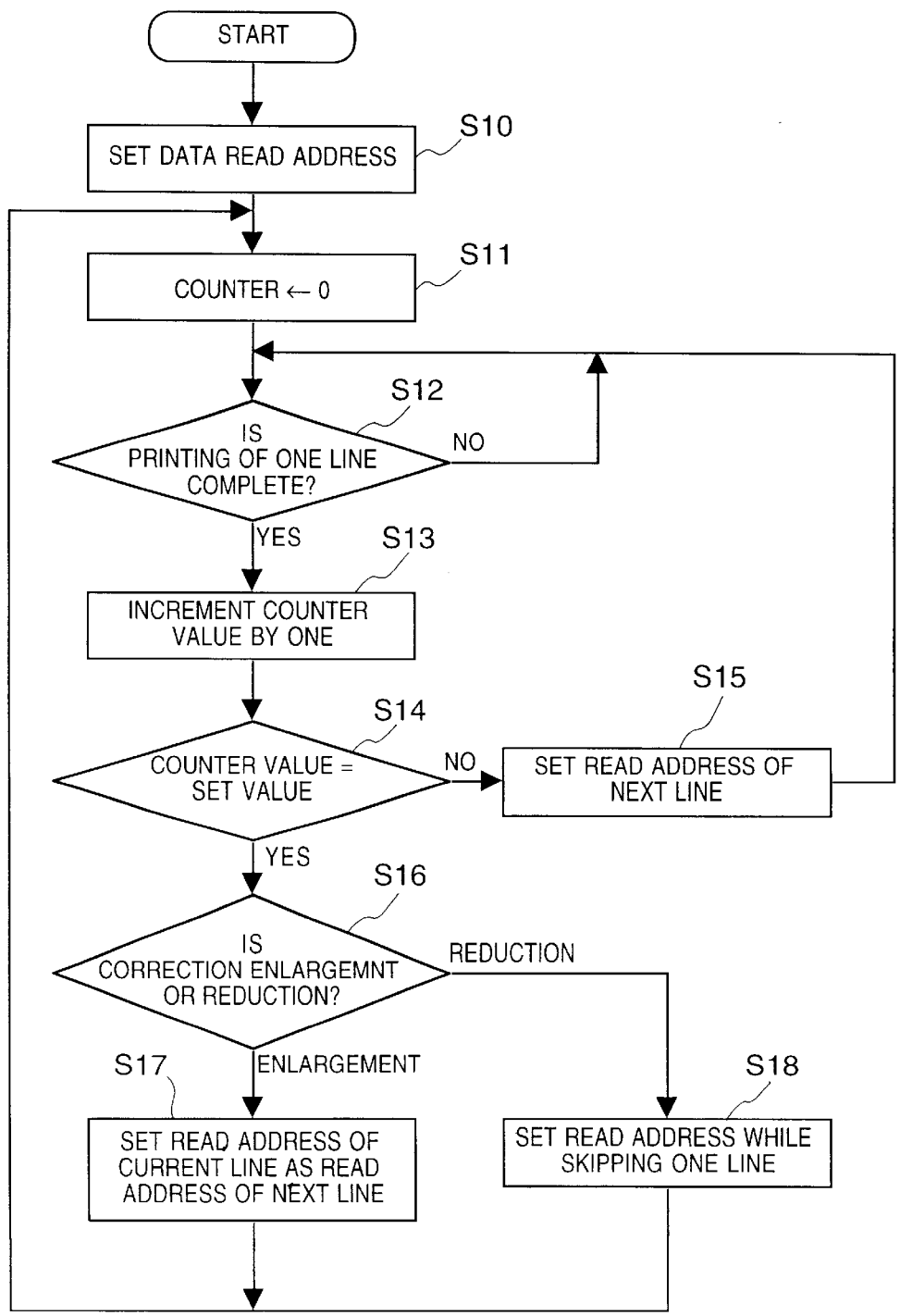
FIG. 10 is a flow chart for explaining image print processing of the first embodiment.

FIG. 10 is a flow chart for explaining image print processing according to the first embodiment. In this embodiment, the control program for realizing control shown in FIG. 10 is stored in the ROM 700b.

When the correction amount is set by operating the operation panel 708, as described above with reference to FIG. 9, a print image is received from the host computer, and data of at least one line is stored in the image memory 704, processing from step S10 is started.

In step S10, the read address of the image memory at which data of one line to be printed is stored is set in the driver controller 703. In step S11, the line counter for counting the number of lines is set to be zero.

The driver controller 703 in which the read address is set sequentially reads out data of one line from the image memory 704 in accordance with the set read address and sends the data to the head driving circuit. The head driving circuit 702 drives the printheads 201 to 204 in accordance with the sent data to print the image of one line. When printing of the image of one line is ended in step S12, the flow advances to step S13 to increment the line counter by one. In step S14, it is determined whether the value of the line counter has reached the line count set as the correction amount. If NO in step S14, the flow advances to step S15 to set the read address of the next line of the image memory 704 in the driver controller, and the flow returns to step S12.

In the loop of steps S11 to S15, normal print processing is performed. Every time one line is printed, the line counter is incremented by one. When the line counter has reached the line count set as the correction amount, the flow advances from step S14 to step S16 to skip or duplicate line data.

In step S16, it is determined whether correction processing is enlargement or reduction. In this example, when data is set in "SKIP" on the operation panel described above with reference to FIG. 9, reduction processing is performed, and when data is set in "PILE", enlargement processing is performed.

For enlargement processing, the flow advances from step S16 to step S17 to set the read address of the current line as the read address of the next line in the driver controller 703 again, and the flow returns to step S11. Consequently, the same line is printed twice, and the line counter is reset to zero.

For reduction processing, the flow advances from step S16 to step S18 to set the read address of the next line while skipping image data of one line. More specifically, the read address of the third line from the current line is set as the read address of the next line in the driver controller 703, and the flow returns to step S11. Consequently, the image data is printed while skipping one line, and the line counter is reset to zero.

As described above, after the print image data sent from the host computer is temporarily stored in the image memory, the read line address is controlled in reading the data from the image memory, thereby correcting any mechanical error of the conveyor mechanism.

(Second Embodiment)

The second embodiment will be described next.

In the first embodiment, when the conveyance error is in the enlargement direction (the actual conveyance amount is larger than the logical conveyance amount), the printed image is enlarged, so image data of one line is skipped to reduce the image. In the first embodiment, for reduction processing, when data is read out from the image memory, the read line start address is updated to one more line ahead to discard print data of one line. For this reason, for the printed image as shown in FIG. 4, rule lines of the graph may be omitted.

In the second embodiment, the image data of a line to be skipped in reduction correction and the image data to be printed next are ORed, and the resultant data is printed for the next line. With this arrangement, omission of image data can be avoided. The second embodiment will be described below. A bubble-jet printhead in the second embodiment has the same structure as in the first embodiment, and a detailed description thereof will be omitted.

Figure 11:
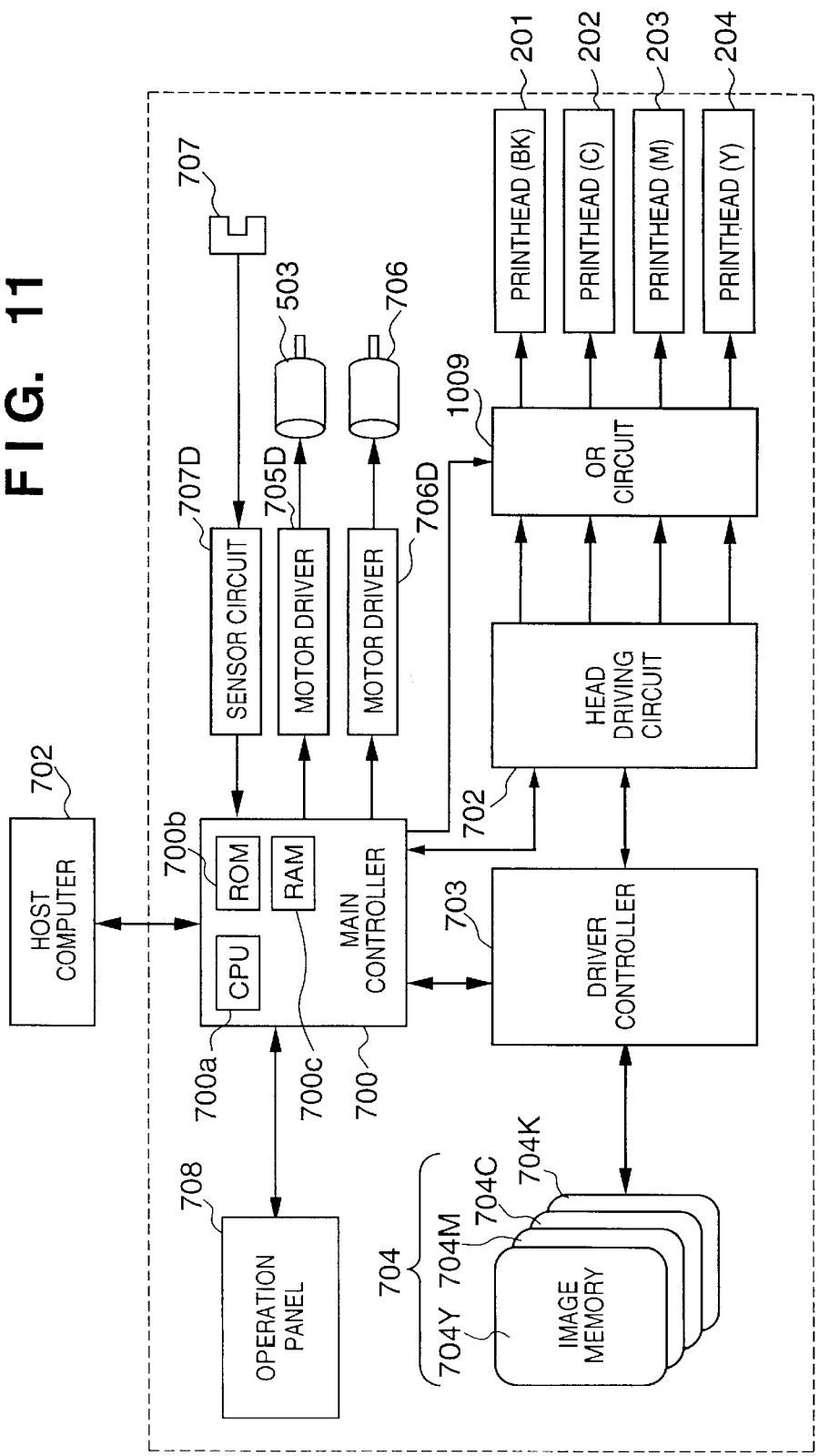
FIG. 11 is a block diagram showing the electrical arrangement of an ink-jet printing apparatus according to the second embodiment.

FIG. 11 is a block diagram showing the electrical arrangement of an ink-jet printing apparatus according to the second embodiment. The same reference numerals as in the first embodiment (FIG. 7) denote the same parts in FIG. 11, and a detailed description thereof will be omitted.

By the same method as in the first embodiment, whether the mechanical error amount and conveyance error of the conveyor mechanism result in enlargement or reduction can be determined. The read line start address of an image memory 704 is controlled on the basis of this information to reduce the printed image when it has been enlarged by the conveyance error or enlarge the printed image when it has been reduced. More specifically, if the actual paper feed amount is smaller than the theoretical value, updating the read line start address is skipped every predetermined number of lines as units of the printed image data from the image memory 704. That is, data of one line is printed twice. By continuously repeating this processing, the length of the printed image can be corrected. For example, when the paper feed error amount is about −0.1%, duplicate printing is performed every 1,000 lines, and when the paper feed error amount is about −0.5%, duplicate printing is performed every 200 lines, thereby performing correction.

Conversely, when the actual paper feed amount is larger than the theoretical value, the second and third read lines are ORed every predetermined number of lines as units of the printed image data from the image memory 704, and resultant data is printed. More specifically, data of a certain line is printed as the OR with data of the next line, so data of two lines is printed as one line to reduce the image. The operation of an OR circuit 1009 will be described below.

Figure 12:
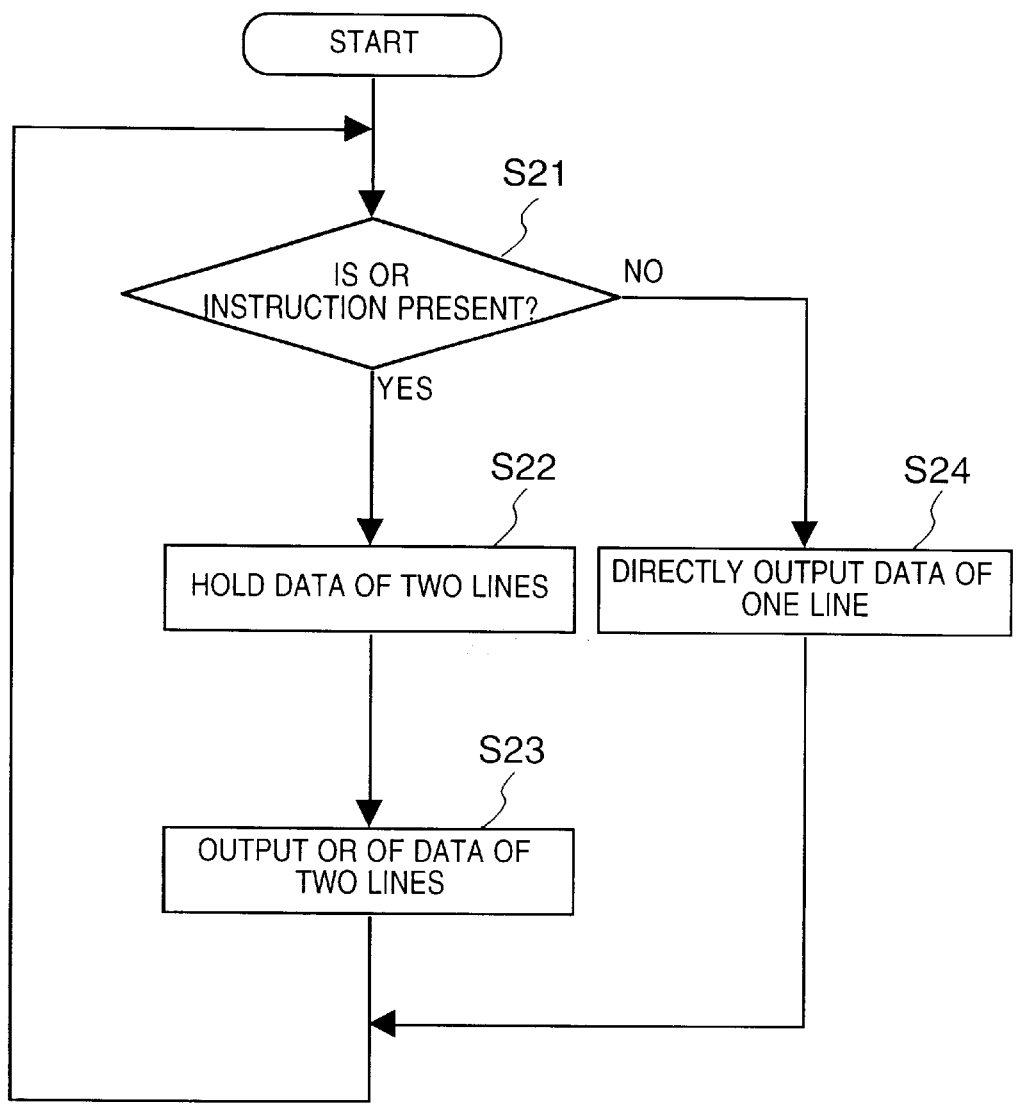
FIG. 12 is a flow chart for explaining the operation of an OR circuit 1009.

FIG. 12 is a flow chart for explaining the operation of the OR circuit 1009. In step S21, it is determined whether an OR execution instruction is received from a main controller 700. If NO in step S21, the driving signal for one line, which is input from a head driving circuit 702, is directly output to the printheads.

If YES in step S21, the flow advances to step S22 to hold the driving signal for one line from the head driving circuit 702. In step S23, when the driving signal for the next line is received from the head driving circuit 702, the driving signal is ORed with that held in step S22 in units of pixels, and the result is output to printheads 201 to 204. In calculating the OR, data of two lines are read out and ORed. Hence, paper conveyance need not be stopped.

Figure 13:
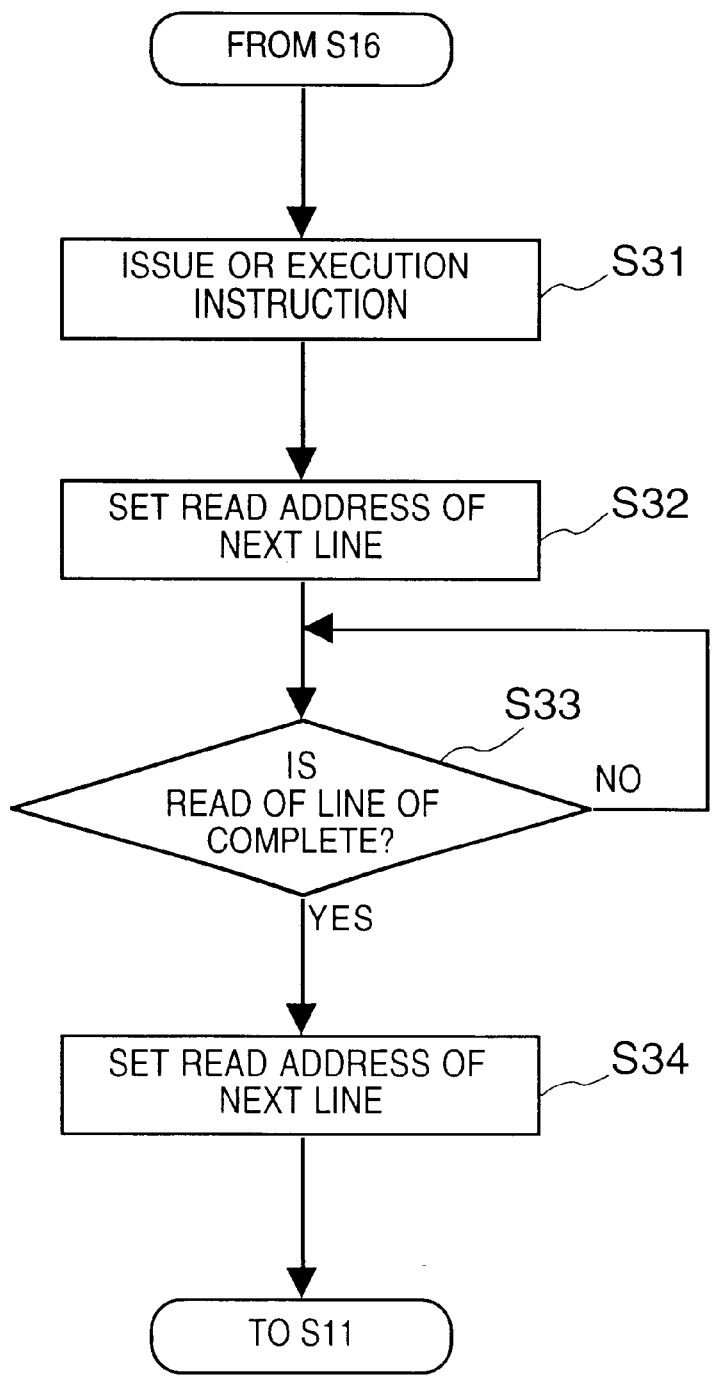
FIG. 13 is a flow chart for explaining the procedure of reduction processing in the second embodiment.

The operation of the main controller 700 in reduction processing in the second embodiment will be described with reference to the flow chart shown in FIG. 13. The flow chart of FIG. 13 replaces processing in step S18 in the flow chart of FIG. 10.

In step S31, the main controller 700 outputs an OR execution instruction to the OR circuit 1009 and sets the read address of a line to be skipped (i.e., the address of the next read line) in a driver controller 703 (step S32).

The driver controller 703 reads out data of one line (this is a line to be skipped) from the image memory 704 in accordance with the set read address and sends it to the head driving circuit 702. The head driving circuit 702 sends a driving signal based on this line data to the OR circuit 1009. The OR circuit 1009 stores this data (step S22) but does not output it to the printheads 201 to 204.

Upon detecting completion of reading of the line, the main controller 700 sets the read address of the next line in the driver controller (steps S33 and S34). The driver controller 703 reads out image data of one line from the image memory 704 in accordance with the set read address and sends it to the head driving circuit 702. The head driving circuit 702 outputs a signal for driving the printheads 201 to 204 on the basis of the received data of one line.

The OR circuit 1009 ORs the signal from the head driving circuit 702 and the signal held inside the circuit in units of pixels and outputs the resultant signal to the printheads 201 to 204 (step S23).

As described above, in reduction processing, the OR of the print image data of a line to be skipped and the next print image data is calculated and transferred to the printhead. By continuously repeating this processing, the length of the printed image can be corrected. For example, when the paper conveyance amount is about +0.1%, OR data of two lines is used every 1,000 lines to print, and when the paper conveyance amount is about +0.5%, OR data of two lines is used every 200 lines to print, thereby correcting the conveyance error.

The OR may be calculated by the driver controller 703, and then the synthesized data may be transferred to the head driving circuit 702.

As described above, according to the second embodiment, reduction processing for correcting image enlargement due to conveyance error is performed using the OR of two lines of image data stored in the image memory. With this arrangement, the mechanical error of the conveyor mechanism can be corrected without losing information of the printed image.

(Third Embodiment)

In the first and second embodiments, the correction amount is set off-line. In the third embodiment, the number of driving pulses between TOF marks is measured during image printing to allow automatic correction amount setting.

The structure of the printhead and the electrical arrangement in the third embodiment are the same as those in the first embodiment, and a detailed description thereof will be omitted.

FIGS. 14A and 14B are views showing correction line periods corresponding to the average values of measured TOF mark intervals. A table as shown in FIGS. 14A and 14B is registered in a ROM 700b in a main controller 700. FIGS. 14A and 14B show numerical values when the reference feed size is 158.75 mm, the conveyance amount per line is 70.556 μm, and the number of lines for 6.25 inches is 2250.0 lines. Referring to FIGS. 14A and 14B, row (1) indicates the count value of the TOF interval, row (2) indicates the conveyance amount per line under condition (1) (=reference feed size (158.75 mm)÷(1)), row (3) indicates the image size when 2,250 lines are printed under condition (2) (=(2)*2250), row (4) indicates the difference between the conveyance amount and the ideal feed amount under condition (2), row (5) indicates a correction amount (number of lines) for obtaining an ideal image size, row (6) indicates whether the line is decimated or duplicated, row (7) indicates the number of lines at which correction of one line is performed (for example, for −8, decimation is performed once per 69 lines, row (8) indicates the size after correction, and row (9) indicates the difference between the actual value and the ideal value after correction.

Figure 15:
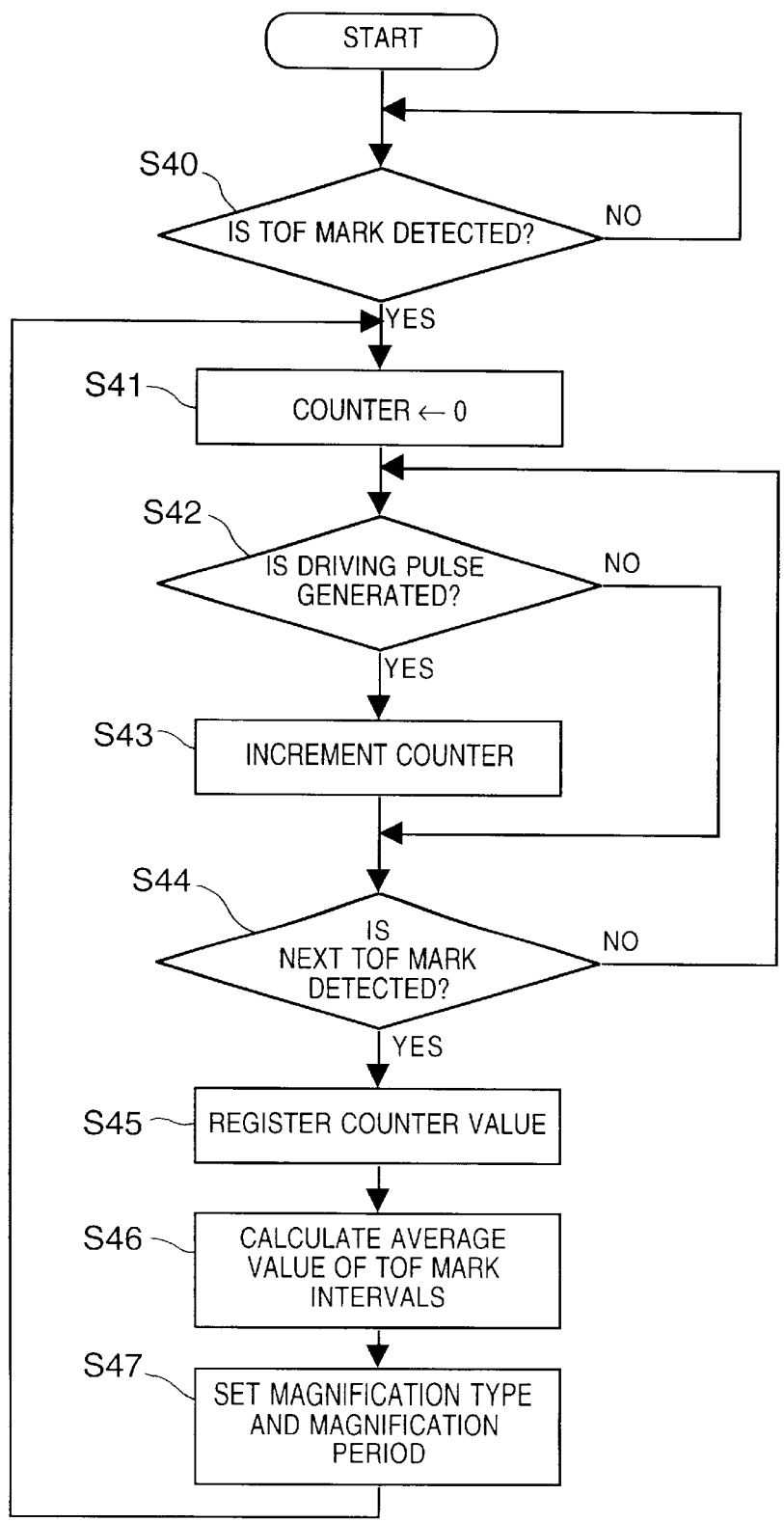
FIG. 15 is a flow chart for explaining the procedure of automatic correction amount setting processing.

FIG. 15 is a flow chart for explaining the procedure of automatic correction amount setting. The control program for realizing control shown in this flow chart is stored in the ROM 700b. Processing shown in FIG. 15 is performed simultaneously with print processing described above with reference to FIG. 10. Therefore, as magnification processing in steps S16 to S18 in FIG. 10, processing described in the first or second embodiment can be used.

In step S40, it is determined whether a TOF mark sensor 707 detects a TOF mark on printing paper. If YES in step S40, the flow advances to step S41 to set 0 in a counter for counting driving pulses to a paper conveyor motor 503. Generated driving pulses are counted until the next TOF mark is detected (steps S42, S43, and S44).

When a TOF mark is detected in step S44, the flow advances to step S45 to store the count value of the counter in a memory (RAM 700c). In step S46, the average of a predetermined number of count values in the past (the average number of driving pulses between TOF marks) is calculated, and the correction amount is set in step S47. To set the correction amount in step S47, the correction line period and type of magnification, i.e., enlargement or reduction are obtained from the table shown in FIGS. 14A and 14B and the average number of driving pulses obtained in step S46.

In the third embodiment, the correction amount is determined using a table as shown in FIGS. 14A and 14B. However, the correction amount may be obtained by calculation using the average value of actually measured values of the number of driving pulses between TOF marks and a theoretical value. Instead of the average value, the number of driving pulses between the preceding TOF marks may be used to obtain the correction amount.

As described above, according to the third embodiment, the intervals between TOF marks are always measured even during printing, and the average value of a predetermined number of measured values in the past is calculated by the main controller, so optimum correction can always be performed.

As described above, since the TOF mark intervals are always measured, and the correction value is automatically set on the basis of the average value of the measured values to perform enlargement/reduction correction, off-line correction amount setting need not be performed, and the user operation is simplified.

As described above, according to the above embodiments, information based on the mechanical conveyance error of the conveyor mechanism is obtained, and magnification is performed while controlling, on the basis of this information, reading from the memory for temporarily storing image data sent from the host computer or the like. As a result, even when one image is to be continuously printed for several meters or more, the length of the image can be accurately maintained, so a printed image with a good dimensional reproducibility can be provided.

According to the above embodiments, mechanical fabrication errors of the paper conveyor mechanism can be corrected, so a high-quality printed image with good dimensional reproducibility can be provided In addition, conveyance amount errors over time due to abrasion of the components of the conveyor mechanism can also be corrected, resulting in longer service life of the apparatus. Furthermore, when the image resolution of the printhead becomes high, the mechanical fabrication accuracy of the mechanical components must be higher. However, when the arrangement of the above embodiments is employed, the mechanical accuracy need not be increased, resulting in low manufacturing cost.

In the above embodiments, application to an ink-jet printing apparatus has been described. However, the present invention can also be applied to a printing apparatus using any other print scheme such as thermal printing.

The present invention may be applied to a system constituted by a plurality of devices (e.g., a host computer, an interface device, a reader, a printer, and the like) or an apparatus comprising a single device (e.g., a copying machine, a facsimile apparatus, or the like)

The object of the present invention is realized even by supplying a storage medium storing software program codes for realizing the functions of the above-described embodiments to a system or an apparatus, and causing the computer (or a CPU or an MPU) of the system or the apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, a hard disk, an optical disk, a magnetooptical disk, a CD-ROM, a CD-R, a magnetic tape, a nonvolatile memory card, a ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As has been described above, according to the present invention, mechanical errors of the conveyor mechanism are absorbed by appropriate magnification processing for print image data.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus for printing an image on a printing medium which is being conveyed, by performing line by line printing using a print head, comprising:

read means for reading out image data from a memory in units of print lines;

driving means for driving conveying means which conveys the printing medium;

image formation means for controlling the conveying means to repeatedly convey the printing medium and printing the image data read out by said read means on the printing medium to form an image on the printing medium;

detecting means for detecting marks formed on the printing medium at a predetermined interval in the conveyance direction;

measurement means for measuring a driving amount of said driving means necessary for conveying the printing medium for a distance between two marks;

setting means for setting a correction amount based on a result of measurement by said measurement means, said setting means determining the number of lines in the conveying direction to be printed between two marks as the correction amount; and correction means for executing a magnification process in a direction of conveyance of the printing medium on the basis of the number of lines determined by said setting means, to correct an image printing length, the magnification process changing the image printing length in the direction of conveyance by processing the image data.

2. The apparatus according to claim 1, further comprising display means for displaying the driving amount measured by said measurement means.

3. The apparatus according to claim 1, wherein said setting means executes said measurement means before printing and sets the correction amount on the basis of the measured driving amount.

4. The apparatus according to claim 3, wherein said setting means can manually set the correction amount.

5. The apparatus according to claim 1, wherein said conveying means includes a pulse motor, and said driving means supplies driving pulses to drive the pulse motor.

6. The apparatus according to claim 1, wherein when the correction amount indicates enlargement as magnification processing, said correction means controls said read means to print two lines using image data of the same line for each of a plurality of print line intervals determined on the basis of the correction amount.

7. The apparatus according to claim 1, wherein when the correction amount indicates reduction as magnification processing, said correction means controls said read means to print the image while skipping image data of one line for each of a plurality of print line intervals determined on the basis of the correction amount.

8. The apparatus according to claim 1, wherein when the correction amount indicates reduction as magnification processing, said correction means ORs image data of two lines to generate image data of one line for each of a plurality of print line intervals determined on the basis of the correction amount and prints the image by using the image data.

9. The apparatus according to claim 1, wherein said setting means sets said measurement means during image print processing and sets the correction amount on the basis of the driving amount measured by said measurement means.

10. The apparatus according to claim 9, wherein said setting means has a table in which a driving amount required for conveyance for the predetermined interval is made to correspond to a correction amount to be set, and sets the correction amount on the basis of the driving amount measured by said measurement means while referring to the table.

11. The apparatus according to claim 9, wherein said setting means sets the correction amount on the basis of an average value of driving amounts measured by said measurement means in the past.

12. The apparatus according to claim 9, wherein said setting means calculates the correction amount on the basis of the driving amount measured by said measurement means and a theoretical value of the driving amount required for conveyance for the predetermined interval.

13. The apparatus according to claim 1, wherein said image formation means comprises an ink-jet printhead for discharging ink to print.

14. The apparatus according to claim 13, wherein said ink-jet printhead discharges the ink using a thermal energy and has a thermal energy conversion element for generating the thermal energy to be applied to the ink.

15. The apparatus according to claim 14, wherein said ink-jet printhead causes a change in state of the ink by the thermal energy applied by the thermal energy conversion element and discharges the ink from an orifice on the basis of the change in state.

16. The printing apparatus according to claim 1, wherein said printing medium is a continuous sheet on which labels are attached, and the marks are located corresponding to the location of the labels.

17. A control method for a printing apparatus which prints an image on a printing medium being conveyed by performing line by line printing using a print head, the method comprising:

the read step of reading out image data from a memory in units of print lines;

the image formation step of repeatedly conveying a printing medium and printing the image data read out in the read step on the printing medium to form an image on the printing medium;

the measurement step of detecting marks formed on the printing medium at a predetermined interval in the conveyance direction, and measuring a driving amount necessary for conveying the printing medium for a distance between two marks;

the setting step of setting a correction amount based on the measurement result in said measurement step, said setting step determining the number of lines in the conveying direction to be printed between two marks as the correction amount; and the correction step of executing a magnification process in a direction of conveyance of the printing medium on the basis of the number of lines determined in said setting step, to correct an image printing length, the magnification process changing the image printing length in the direction of conveyance by processing the image data.

18. The method according to claim 17, further comprising the display step of displaying the driving amount measured in the measurement step.

19. The method according to claim 17, wherein the measurement step and the setting step is performed and completed before printing.

20. The method according to claim 19, wherein the setting step comprises manually setting the correction amount.

21. The method according to claim 17, wherein the printing medium is conveyed by a pulse motor in the image formation step, and the driving amount corresponds to the number of driving steps of the pulse motor.

22. The method according to claim 17, wherein when the correction amount indicates enlargement as magnification processing, the correction step comprises controlling the read step to print two lines using image data of the same line for each of a plurality of print line intervals determined on the basis of the correction amount.

23. The method according to claim 17, wherein when the correction amount indicates reduction as magnification processing, the correction step comprises controlling the read step to print the image while skipping image data of one line for each of a plurality of print line intervals determined on the basis of the correction amount.

24. The method according to claim 17, wherein when the correction amount indicates reduction as magnification processing, the correction step comprises ORing image data of two lines to generate image data of one line for each of a plurality of print line intervals determined on the basis of the correction amount and printing the image by using the image data.

25. The method according to claim 17, wherein the measurement step and the setting step is performed during image print processing.

26. The method according to claim 25, wherein the setting step has a table in which a driving amount required for conveyance for the predetermined interval is made to correspond to a correction amount to be set, and comprises setting the correction amount on the basis of the driving amount measured in the measurement step while referring to the table.

27. The method according to claim 25, wherein the setting step comprises setting the correction amount on the basis of an average value of driving amounts measured in the measurement step in the past.

28. The method according to claim 25, wherein the setting step comprises calculating the correction amount on the basis of the driving amount measured in the measurement step and a theoretical value of the driving amount required for conveyance for the predetermined interval.

29. The control method according to claim 17, wherein the measurement step measures the driving amount required to convey the printing medium between two consecutive marks.

30. The control method according to claim 17, wherein said printing medium is a continuous sheet on which labels are attached, and the marks are located corresponding to the location of the labels.

31. A storage medium storing a control program for forming an image on a printing medium which is being conveyed, by performing line by line printing using a print head, comprising:

a code for the read step of reading out image data from a memory in units of print lines;

a code for the image formation step of repeatedly conveying a printing medium and printing the image data read out in the read step on the printing medium to form an image on the printing medium;

a code for the measurement step of detecting marks formed on the printing medium at a predetermined interval in the conveyance direction, and measuring a driving amount of said driving means necessary for conveying the printing medium for a distance between two marks;

a code for the setting step of setting a correction amount based on a result of measurement in said measurement step, said setting step determining the number of lines in the conveying direction to be printed between two marks as the correction amount; and a code for the correction step of executing a magnification process in a direction of conveyance of the printing medium on the basis of the number of lines determined in said setting step, to correct an image printing length, the magnification process changing the image printing length in the direction of conveyance by processing the image data.

* * * * *

UNITED STATES PATENT AND TRADEMARK OFFICE
CERTIFICATE OF CORRECTION

PATENT NO. : 6,733,101 B2
DATED : May 11, 2004
INVENTOR(S) : Katayama et al.

It is certified that error appears in the above-identified patent and that said Letters Patent is hereby corrected as shown below:

Title page,
Item [56], References Cited, FOREIGN PATENT DOCUMENTS, "EP 62-216777 9/1987" should read -- JP 62-216777 9/1987 --.

Signed and Sealed this

Twenty-fourth Day of August, 2004

JON W. DUDAS
*Director of the United States Patent and Trademark Office*